United States Patent
Tuzel et al.

(10) Patent No.: US 8,620,073 B2
(45) Date of Patent: Dec. 31, 2013

(54) UPSCALING NATURAL IMAGES (75) Inventors: Oncel Tuzel, Cambridge, MA (US);
Fatih Porikli, Watertown, MA (US);
Chinmay Hegde, Houston, TX (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 128 days.

(21) Appl. No.: 13/405,155

(22) Filed: Feb. 24, 2012

(65) Prior Publication Data

US 2013/0223734 A1 Aug. 29, 2013

(51) Int. Cl.
*G06K 9/00* (2006.01)
(52) U.S. Cl.
USPC .............. 382/167; 375/240.02; 375/240.21; 382/166; 382/264; 382/266
(58) Field of Classification Search
None
See application file for complete search history.

(56) References Cited

U.S. PATENT DOCUMENTS

| | | | |
|---|---|---|---|
| 2007/0140350 A1* | 6/2007 | Sakazume et al. | 375/240.21 |
| 2008/0267494 A1* | 10/2008 | Cohen et al. | 382/166 |
| 2009/0252411 A1* | 10/2009 | Siddiqui et al. | 382/167 |
| 2011/0038558 A1* | 2/2011 | Lee et al. | 382/264 |
| 2011/0188749 A1* | 8/2011 | Zhu et al. | 382/167 |
| 2012/0170646 A1* | 7/2012 | Baylon et al. | 375/240.02 |
| 2013/0044965 A1* | 2/2013 | Chien et al. | 382/266 |

* cited by examiner

*Primary Examiner* — Tsung-Yin Tsai
(74) *Attorney, Agent, or Firm* — Dirk Brinkman; Gene Vinokur (57) ABSTRACT

A natural input image is upscaled, first by interpolation. Second, edges in the interpolated image are sharpened by a lion-parametric patch transform. The result is decomposed into an edge layer and a detail layer. Only pixels in the detail layer enhanced, and the enhanced detail layer is merged with the edge layer to produce a high resolution version of the input image.

19 Claims, 5 Drawing Sheets

UPSCALING NATURAL IMAGES

FIELD OF THE INVENTION

The invention relates generally to image processing, and more particularly to upscaling by increasing the resolution of natural scenes to produce high-resolution images.

BACKGROUND OF THE INVENTION

The last few years in imaging technology has witnessed an advent of ubiquitous high-definition (HD) image display systems, as well as an exponential growth in the number of low-resolution image acquisition devices, such as cellular telephones, laptops, web cameras and other hand-held devices.

Given this scenario, the classical problem of image upscaling assumes a renewed significance. Image upscaling, also variously termed as upscaling and super-resolution, is a highly ill-posed linear inverse problem, because the number of unknowns, i.e., high-resolution image pixel values, exceeds the number of observations, i.e., low-resolution pixel values, by an order of magnitude, even at moderate upscaling factors.

The challenge is exacerbated by the unique difficulties encountered in modeling images of natural scenes, as well as the inevitable presence of added nuisances such as camera blur and noise in captured images.

Image upscaling methods can be catecorizied as parametric and non-parametric. Methods belonging to the first category assume parametric models for the output high-resolution image. The prominent method in this class uses bicubic interpolation. That method assumes a bandlimited structure in images. The method is indeed the most common in commercial photo editing packages such as Adobe Photoshop.

Over the last ten years, more sophisticated parametric models have been developed. Total variation minimization methods assume that images have bounded total variation (TV) norms. Probabilistic models assume a prior on gradient profiles of images, and specify or estimate from data the hyperparameters of these priors. Sparse models assume that image patches are sparse in a basis or learned dictionary.

Methods belonging to the second category do not assume an explicit model for images or image patches; instead those methods exploit natural image invariances, such as scale- or translation-invariance. In such cases, the prior for the high-resolution unknown image patches are raw patches from a database of external images, or even patches from the scale-space input image. Those methods "learn" correspondences between high-resolution and low resolution patches and store the correspondences in a searchable database. During reconstruction, every occurrence of a low-resolution patch is replaced by its corresponding high-resolution patch.

Both categories typically have one or more of the following drawbacks.

Loss of Fine Details:
Neither category of methods seems to reproduce realistic textural details for even moderate upscaling factors.

Visual Artifacts:
The resulting images suffer from various artifacts such as blurry edges, exaggerated noise, halos, ringing and aliasing artifacts, (staircases or jaggies).

Computational Demands:
All prior art methods involve considerable computational costs. Upscaling a small (128×128) image by a factor of four might typically take several minutes.

SUMMARY OF THE INVENTION

Embodiments of the invention provide a method for upscaling a natural image. Prior art methods for image upscaling tend to produce high-resolution images with either blurry salient edges, or loss of fine textural detail, or spurious noise artifacts.

The invention reduces these effects by modeling the image as a sum of an edge layer and a detail layer and processing the layers separately.

The upscaling formulates an image as a solution to a non-convex energy minimization problem, and the method obtains a tractable approximate solution.

The method includes two main stages:

1) We use a nonparametric approach by constructing a dictionary of patches from the image, and synthesize the higher resolution image. This nonparametric synthesis step interpolates the smooth regions of the image while sharpening the edges, thereby generating the higher-resolution edge layer.

2) We conceptually decompose the image into the edge layer and the detail layer and use a parametric texture enhancement approach to enhance detail regions across the upscaled detail layer.

The method accurately reproduces sharp edges as well as synthesizes photorealistic textures, while avoiding common artifacts, such as ringing and haloing.

In addition, the method involves no training or estimation of model parameters, and can be parallelized in a graphics processor unit.

DETAILED DESCRIPTION OF THE PREFERRED EMBODIMENTS

Embodiments of our invention provide a method for upscaling an image, specifically an image of a natural scene rich in detail and texture. Generally, the images are intensity (luminance) images with a dynamic range [0,1].

Figure 1:
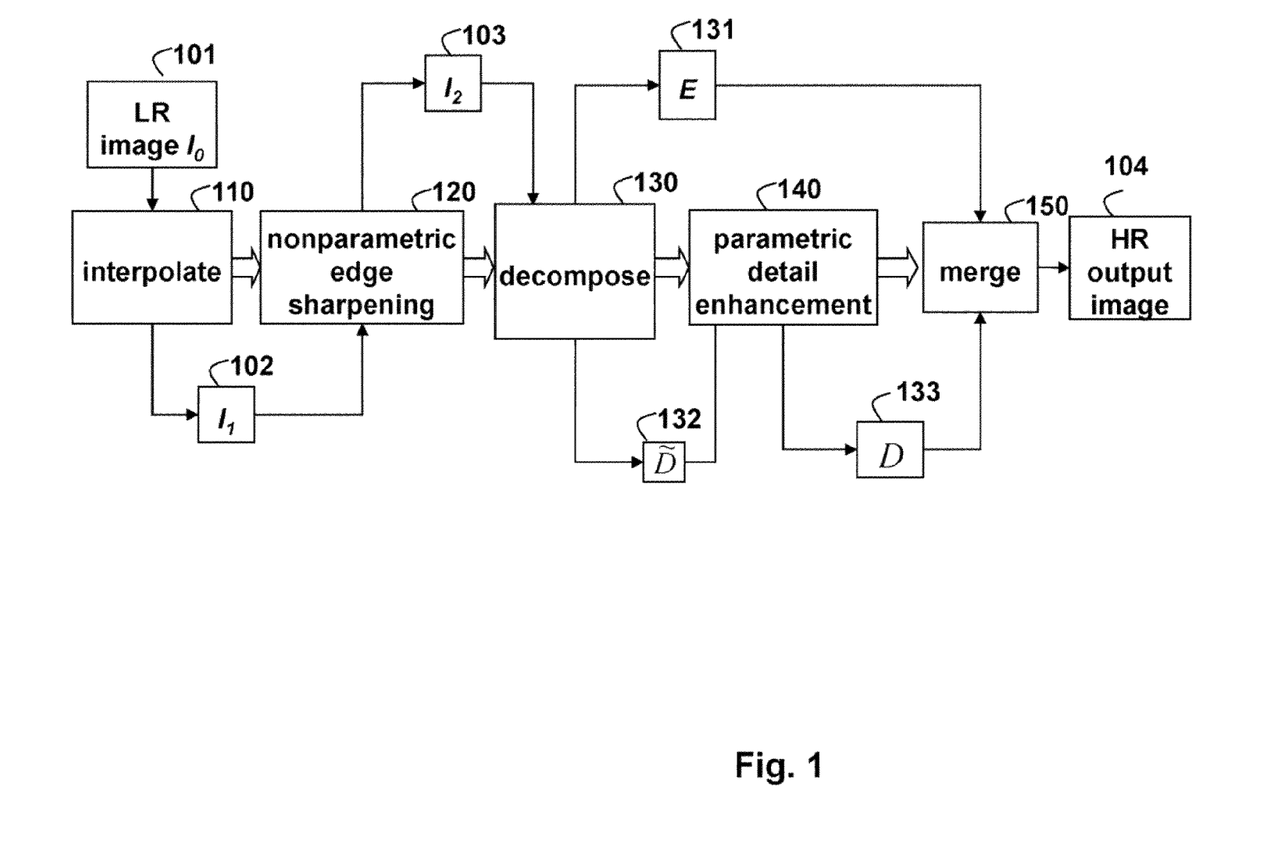
FIG. 1 is a flow diagram of the upscaling method according to embodiments of the invention.
Figure 2:
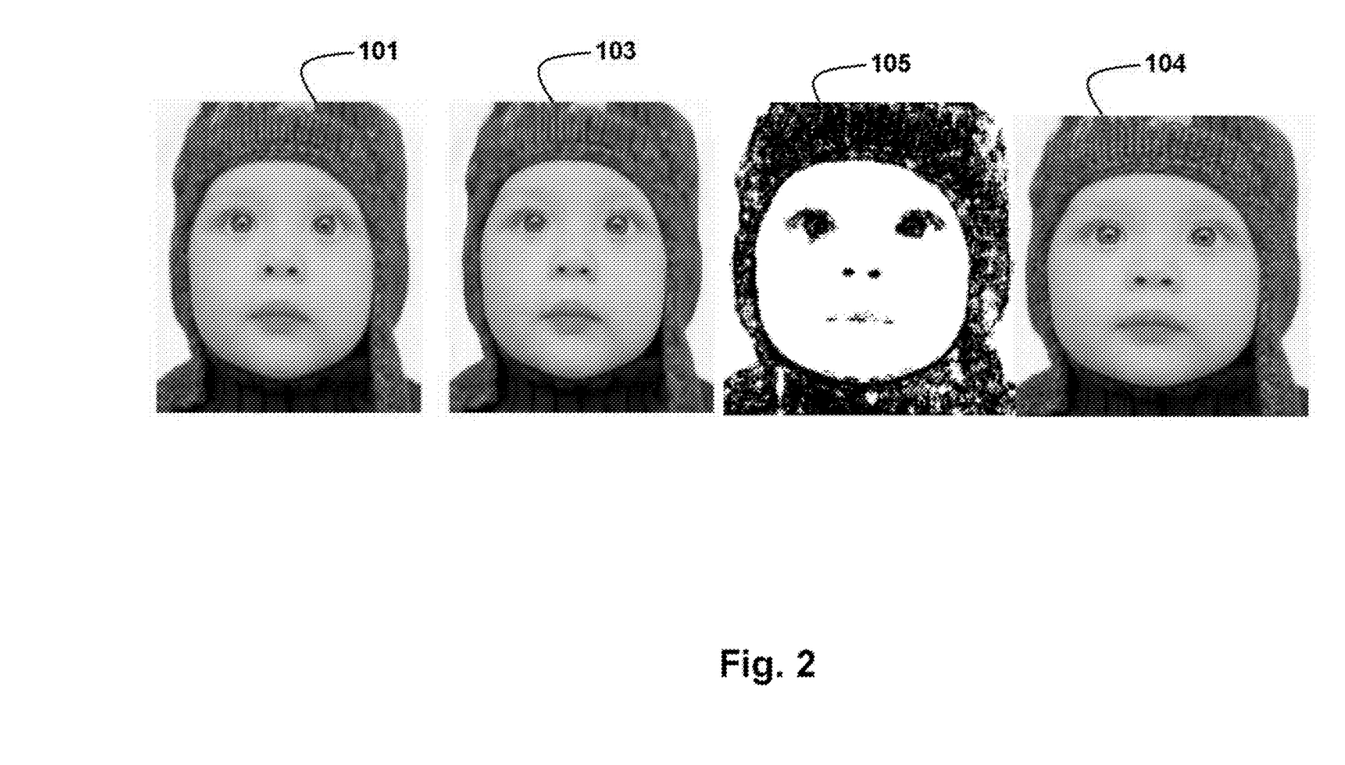
FIG. 2 shows images modeling upscaling according to embodiments of the invention.
Figure 3:
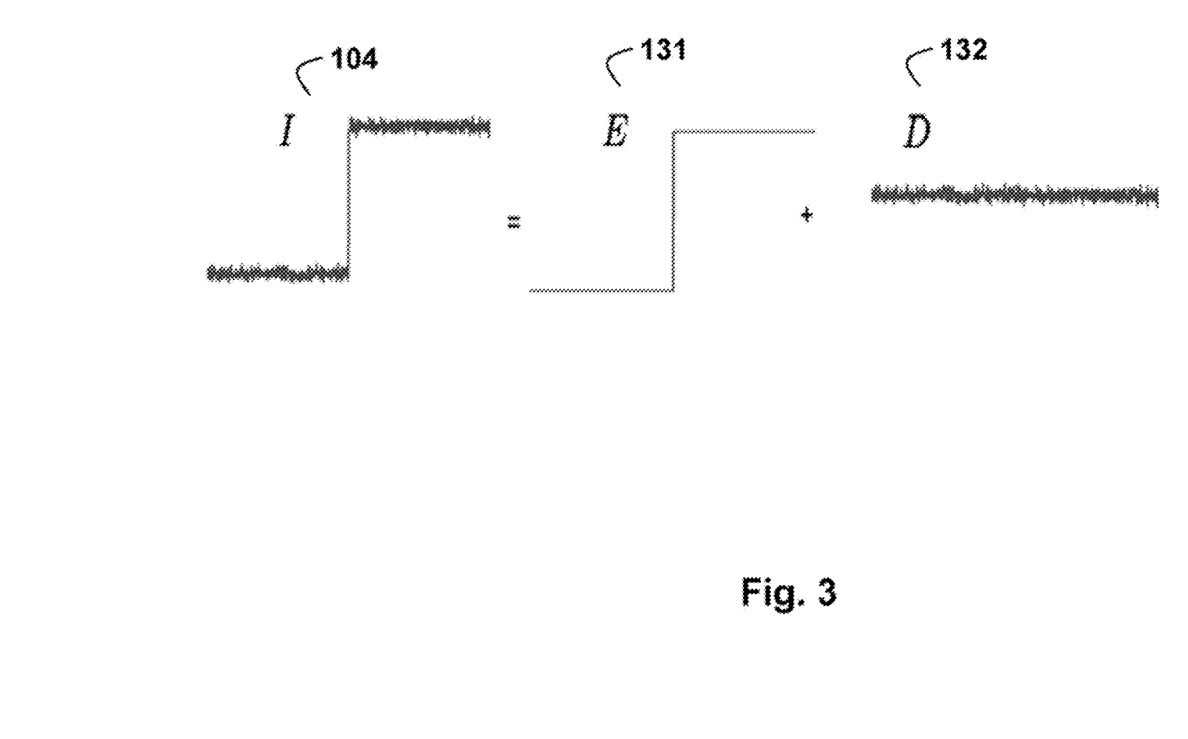
FIG. 3 is a 1D schematic of modeling an image as a sum of an edge layer and a detail layer according to embodiments of the invention.
Figure 5:
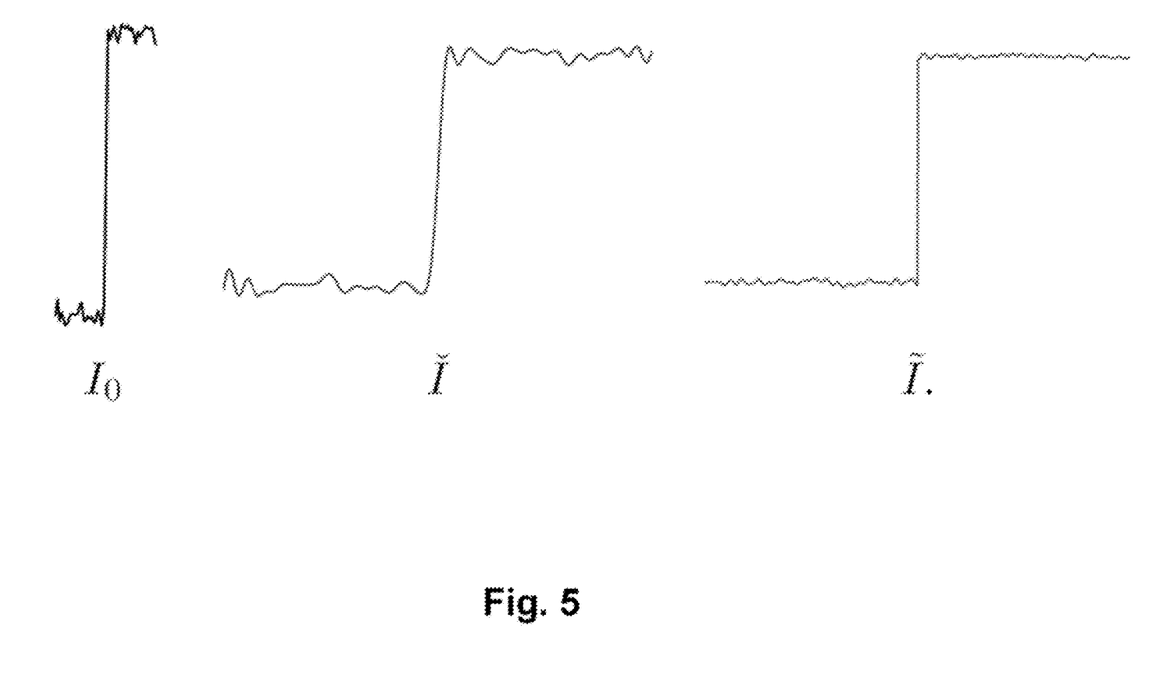
FIG. 5 is a 1D schematic of an upscaling process according to embodiments of the invention according to embodiments of the invention.

FIG. 1 shows the steps of our upscaling method. FIG. 2 shows images modeling the upscaling. FIG. 3 is a 1D schematic of modeling an image as a sum of an edge layer and a detail layer according. FIG. 5 is a 1D schematic of an upscaling process according to embodiments of the invention according to embodiments of the invention. The method steps described herein can be performed in a conventional processor, or parallelized in a graphics processing unit.

Input to the method is a low-resolution n×n image $I_0$ 101. Our goal is to obtain a photorealistic high-resolution natural output image I 104 whose downsampled version is substantially equal to the input image $I_0$.

Conceptually, the high-resolution output image I can be decomposed and modeled as an edge layer E 131, and a detail layer D 132

$$I = E + D \quad (1)$$

where the edge layer E is piecewise smooth function such as single color or step edge, etc., and the detail layer D includes high-frequency variations of small magnitude such as texture.

If L denotes a linear downsampling operator, then the low-resolution input image $I_0$ 101 is $$I_0 = L(I) = L(E+D) \quad (2).$$

Equation 2 represents a highly underdetermined system of linear equations comprising $n^2$ constraints and $2\alpha^2 n^2$ unknowns, where $\alpha > 1$ is an upscaling factor. Consequently, this formulation is ill-posed.

Upsampling the input low-resolution image $I_0$, using, e.g., bicubic interpolation 110, generates an initial estimate $I_1$ 102 of the output high-resolution image I 104. The initial estimate $I_1$ is sharpened 120 using a localized nonparametric patch synthesis to obtain a second estimate $I_2$ 103 where the sharp edges and smooth texture regions are reproduced in high-resolution.

While the second estimate $I_2$ 103 reproduces the sharp edges and smooth regions, it suffers from a noticeable lack of detail. Therefore, the upscaled second image estimate 103 is decomposed 130 into the edge and detail layers, and an S-shaped curve is applied to the detail layer $\tilde{D}$ 132 to produce an enhanced detail image D 133 with smooth texture regions.

To prevent exaggeration of noise and other artifacts, we use a blending $\alpha$-mask 105, determined during a synthesis step, to selectively enhance only the detail layer, and thus obtain the final image I 104 by merging 140 the edge layer 131 and the enhanced detail layer D 133.

Optimization Via Patch Transform

The following describes our regularization to solve the underdetermined problem given in Equation 2. Generally, given an arbitrary image I, we denote a patch transform P(I) as the set of (overlapping) r×r patches extracted from the input image 101, or alternatively, the high-resolution first intermediate image 102. Obviously, the patch transform P is an invertible mapping. Ignoring image boundary effects, every pixel in the image occurs in $r^2$ elements in P.

For completeness, we denote the inverse linear synthesis as I=S(P). Any pixel intensity at a location x in the image 1 can be represented as a mean of the intensity values of the $r^2$ patches that contain the pixel x, i.e., $I(x)=\text{mean}(p(x))$, $p \in P(I)$. The pixel variance of the $r^2$ for different pixel intensities at x is zero.

Due to the one-to-one nature of the patch transform, any prior on the patch transform of an image is equivalent to a modified prior on the image itself.

An intuitive regularization for equation (2) would require that the patch transform P(I) be a subset of the set of natural image patches M, because it is well known that the set M occupies an extremely tiny fraction of the space of all possible r×r patches.

However, this constraint is unwieldy because there is no known concise parametric or non-parametric model for the patches M. Indeed, there is no consensus for what characterizes a natural image in the first place.

Therefore, we adopt a more tractable relaxation of equation (2). The patch transform of the target image P(I) must be contained in the patch transform of the low-resolution image $P(I_0)$.

This hypothesis is justified because it is known that natural image patches tend to be self-similar in highly localized regions in scale space. Therefore, our upsampled image can be posed as a solution to the following optimization:

$$\hat{I} = \arg\min \|I_0 - L(I)\|,$$

such that $$I=(P), \text{ and } P(I) \subset P(I_0) \quad (3)$$

This optimization has two problems. The first is computation complexity. The equation (3) is a highly non-convex, combinatorial subset selection problem, and therefore is very difficult to optimize exactly. However, there potentially exist fast approximate schemes to obtain a suboptimal solution, one of which we describe below.

The second problem arises due to a subtle modeling error, importantly in practice, that the patch transform of the low-resolution image $I_0$ only contains the patch transform of the edge layer P(E), and cannot model patches from the detail layer D. Indeed, as extensive experiments with natural images have shown, the scale invariance property for natural images holds for smooth regions and sharp edges, but not for fine textural details.

For the detail layer D=0, we can conceptually obtain a precise, consistent solution. However, when D≠0, different patches in $P(\hat{I})$ containing the location x offer inconsistent explanations of the pixel value at x. Consequently, the variance of the different pixel explanations at x is high, and the detail pixels gets "averaged out." This phenomenon can be corroborated by experiments.

We describe a greedy nonparametric procedure for solving the above optimization problem. We also detect which pixels possess a high pixel variance. These pixels correspond to the detail pixels. We then employ a detail enhancement heuristic to reconstruct the detail pixels, simultaneously making sure that the final result is consistent with the input low-resolution image. The full method is as discussed below.

Upscaling Method

Our method includes two subroutines that are applied alternately. We first estimate a patch transform of the desired image using the non-parametric approach. Given a blurry high-resolution patch, we extract a few similar raw patches from the input low-resolution image and replace the blurry patch with a weighted combination of the extracted raw patches.

Next, we perform an edge-detail decomposition 130 of the estimated image, and carry out a pointwise remapping 140 to enhance only the detail pixels. A careful recombination (merge) 150 of the outputs of this decomposition results in the photorealistic final image 104 that has sharp edges, fine scale details, and no visible artifacts in smooth regions.

Estimation of the Edge Layer

Given the input low-resolution image $I_0$ 101, we perform interpolation 110 using a fast parametric interpolation, e.g., bicubic interpolation. The factor used for the interpolation can be user selected. If U denotes a linear interpolation operator, then the image $$\hat{I} = U(I_0)$$

represents our initial intermediate image 102 of the upscaled image.

However, this parametric interpolation results in reduced sharpness of edges, resulting in a degradation in quality. We compensate for this as follows. Given a blurry high-resolution r×r patch $p(x) \subset \tilde{I}$, where x denotes the spatial location o the patch, we perform a localized search for raw r×r patches in the low-resolution image $I_0$, e.g. r=5.

Formally, we perform a nearest-neighbor search:

$$q = \arg\min_{p'(x') \in I_0} d_1(p', p) + \lambda d_2(x', x), \quad (4)$$

where $d_1$ is the distance between the patch intensity values and $d_2$ represents the distance between the spatial locations of the patches, which are normalized with respect to the size of the image. We use this distance function because it penalizes both distances.

In a conventional manner, we remove the DC component of each patch before performing the nearest neighbor optimization. We set $\lambda=10$, for example.

After a small number of similar patches $q_j$ have been found, we replace the patch p with a weighted combination of the extracted raw patches. Overlaps between the resulting patches q are further averaged to reduce blocking artifacts:

$$\tilde{I}(x') = \sum_{j: x' \in q_j} q_j \cdot w_{q_j} \cdot G_\sigma, \quad (5)$$

where Gaussian weights $G_\sigma$ favor greater weights to the center of the 5×5 patches q ($\sigma=1.25$), and the weights $w_q = d_1(q, p)^{-1}$ favor greater weights to better matches to the image. Note that Eqn. 5 effectively determines a weighted version of the synthesis step S, the inverse of the patch transform of $\tilde{I}$. Thus, if N denotes the overall non-parametric synthesis procedure, then we have that $$\tilde{I} = N(\hat{I}).$$

Thus, we obtain a second intermediate image $\tilde{I}$ 103 with sharp, realistic-looking edges.

In another embodiment, we replace the patch p with a weighted combination of reference patches. These reference patches are selected from the same sized patches of the LR image 101. Alternatively, we select the patches from a dictionary of patches learned from the LR image.

When we determine the reference patches, we minimize an error function that we defined as $$\min \|p - RA\|^2 + \beta \sum_i \|A_i\|_0,$$

where R is the set of the all reference patches, i.e., our dictionary, A is a reconstruction coefficients, i.e., weights of the selected reference patches, β is a constant number, $\|A_i\|_0$ is the number of non-zero coefficients. Instead of the number of non-zero coefficients, we also use the sum of the absolute values of the coefficients to impose sparsity as follows $$\min \|p - RA\|^2 + \beta \sum_i \|A_i\|_1.$$

In this manner, we have simulated the optimization in Eq. 3. However, the estimate $\tilde{I}$ suffers from a loss of detail in textured regions. The reason is that the small, fine-scale variations present in textured regions in the high-resolution target image do not manifest themselves in their lower-resolution counterparts. Therefore, the variations cannot be synthesized by a simple non-parametric search, and are averaged out in the synthesis step S (Eq. 5).

Enhancing the Detail Layer

To solve this problem, we perform a global detail enhancement on $\tilde{I}$. We decompose $\tilde{I}$ into a piecewise-smooth component (edge layer 131) and a detail component (detail layer 132), similar to the model shown in FIG. 3, using the weighted least-squares (WLS) approach.

We select this method because it generates high quality decompositions in linear time. Other decompositions, such as the bilateral filter can also be used. $\tilde{I} = \tilde{E} + \tilde{D}$.

Next, we apply a detail-enhancing pixelwise remapping function:

$$f(\Delta) = \Delta^\beta,$$

to obtain the enhanced detail layer image $D = f(\tilde{D})$ 133. For example, the function is a Sigmoid functions, e.g., arctangent, hyperbolic tangent, logistic function, and algebraic functions such as $$f(x) = \frac{x}{\sqrt{1+x^2}}.$$

We call this function an "S-curve."

Figure 4:
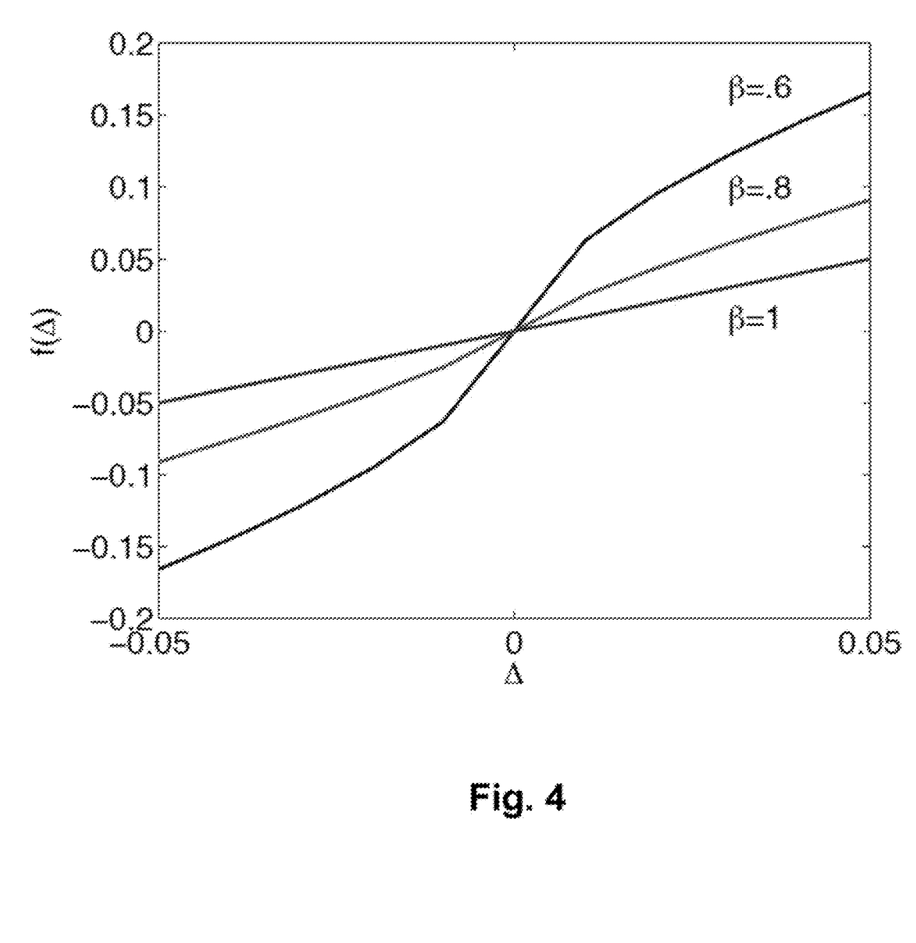
FIG. 4 is a graph of remapping function according to embodiments of the invention.

FIG. 4 shows some example remapping functions $f(\cdot)$. In the detail-enhancing pointwise pixel remapping functions $f(\Delta) = \Delta^\beta$ for various values of β, smaller values of β indicate a higher amount of detail enhancement, i.e., the amount of detail is inversely proportional to β. The selection of the scalar parameter β is described below.

This sharpening step 120 restores fine-scale details, but also aggravates noise and artifacts in smooth and edge regions. Therefore, while synthesizing the final image, we only consider the pixels that have been "excessively averaged" ill the previous step.

This is achieved by computing the variance of different explanations for a pixel in the patch transform synthesis (Eqn. 5), and constructing the binary α-mask 105 that indicates the pixels with high pixel variance, as shown in FIG. 2.

We selectively blend and merge 150 in these pixels from the sharpened edge layer and enhanced detail layer using:

$$\hat{I} = (1-\alpha)\tilde{I} + \alpha f(\tilde{D}) = \epsilon(\tilde{I}),$$

where $f$ denotes the blending function, and $\epsilon$ denotes the overall detail-enhancement operator.

This step results in the high-resolution output image $\hat{I}$ 104 with sharp edges and a requisite amount of details. Thus, the overall upscaling procedure can be summarized by a composite operator relation:

$$\hat{I} = \epsilon(N(U(I_0))) \quad (6)$$

FIG. 5 shows, for a simplified 1D signal, the results of some intermediate steps in our method. The bicubic upscaling step U yields poor results on both edges and textures. The non-parametric synthesis step N corrects for the edges, but suffers from a lack of details.

FIG. 2 shows the result 104 of applying the upscaling to the example natural image 101, and serves to highlight the importance of the detail enhancement step $\epsilon$ within our framework. The step $\epsilon$, together with an intuitively selected blending function α, ensures that relevant and photorealistic details are added.

Consistency

An important consideration is to ensure that each of the upscaling operators results in an image that is consistent with the low-resolution image. We achieve this by performing a small number of iterations of a linear back-projection step, commonly used in many upscaling schemes, at the end of intermediate estimation and final estimation. This step is equivalent to finding the closest output image in the subspace of feasible high resolution solutions to the estimated image, thus ensuring estimated intermediate image $\tilde{I}$ 103 and final image $\hat{I}$ 104 are consistent with the low resolution input image $I_0$.

Method Details

In practice, the above upscaling process gives desirable results for upscaling factors <1.25. This is due to the fact that the scale-invariance hypothesis is valid only for small scale factors. To achieve any desired magnification factor, our procedure is repeated several times, e.g., to achieve a upscaling factor of four or larger. The above three-step approach is performed by applying a scale factor of $\gamma=2^{1/3}$ a total of six successive times.

For a given three channel color image, we can perform the above upscaling by first transforming the image into YCbCr space, and applying the upscaling to the luminance channel. This is due to the well-known fact that visual perception of edges and details responds primarily to the luminance of the image. This method also applies to range images where each pixel of the image corresponds to the distance between the camera and the observed scene point.

Parameters

In sharp contrast with parametric upscaling methods, such as imposed edge statistics and gradient profile priors, our method does not involve any training to estimate the different parameters. Our method is robust to the choice of the number of intermediate upscaling steps $\gamma$. Further, it is also robust to the choice of the number of nearest neighbors obtained in the nonparametric search k, as well as the choice of the weighting parameter $\lambda$ that controls the tradeoff between accuracy of nearest neighbors versus the locality of the search.

The only changing parameter can be limited to the exponent $\beta$ used in the detail enhancement step. The exponent varies depending on the amount of detail present in the original image, as well as the sharpness of desired detail in the upsampled image. A smaller value of $\beta$ corresponds to a 'more-acute' S-curve, and hence exaggerates finer details.

FIG. 4 shows the effect of varying the parameter $\beta$ across a range of values, where $\beta=1.0$ implies that no detail layer exaggeration is performed. For small values of $\beta$, we notice that the details get artificially exaggerated. Unless otherwise stated, we use the value $\beta=0.8$. In our experience, this choice yields visually pleasant results.

Computational Advantages

Our method does not involve any external database. Instead, the method only relies on self similarities present in the input image. Furthermore, the method does not require special learning, training, or tuning of model parameters. Moreover, our method obviates the need for an exhaustive search of the image's scale space.

To synthesize each upscaling estimate, we only operate upon pixels and patches belonging to the current intermediate estimated image. The dominant factor in the computational complexity is the nearest neighbor search in Eq. 4. A higher value of $\lambda$ in the minimization implies two axis aligned orthogonal principle search directions (two spatial coordinates) in the search space. Therefore, exact nearest neighbor search for a given patch can be performed in $o(n^{1/2})$ time using adaptive k-d tree search structure where N is the number of pixels in the image. This yields sub-quadratic complexity $O(N^{3/2})$ for the overall method, which is a significant improvement over state-of-the-art nonparametric methods, which involve a complex training phase and whose best-case complexity is quadratic $O(N^2)$).

Results

Our method achieves significant improvements over the nonparametric scale-space search method. Our method accurately reproduces sharp edges, reduces haloing artifacts, and synthesizes photorealistic textures. The method perceptually improves the output image, particularly in detail (texture) regions. Our method does not require complex parameter training phase, and has a much improved speed of recovery.

Implementation Details

We perform the steps of our method using MATLAB executing on a Windows desktop machine with a 3.4 GHz dual-core Intel-i7 processor. On an average, our method takes less than one minute to upsample an image of size 200×200 by a magnification factor of four in either dimension.

Compared to other example-based upscaling and texture enhancement methods, this represents an order-of-magnitude increase in speed. A key reason for this improvement is that we favor local searches in our edge-enhancement step (Eq. 4). This greatly reduces computational demands, as well as makes our method easily parallelizable. Hence our method can be implemented on a graphics processor unit.

Comparisons to Prior Art

Our method extends and refines aspects of various existing super-resolution and detail enhancement methods. Primarily, we have advocated to explicitly deal with upscaling of texture details, which has been the bane for many super-resolution methods. Our method bears resemblance to a scale-space search approach. However, we recognize that the non-parametric search is both computationally demanding, as well as fails to reproduce fine textures, and thus discuss methods to alleviate these concerns.

Our method also can be linked to a non-stationary filter-based upscaling method, which also uses a non-parametric search step to upsample the sharp edges. However, the upscaling filters used in that method are often hard to compute for arbitrary scaling factors. We contrast our proposed method with the texture hallucination approach. We agree that textures are problematic in natural image upscaling. However, we provide a universal scheme for reproducing high-resolution textures that does not require manual intervention, obviates the need for a training database, and has a great reduction in computational complexity.

In contrast to previous methods for image upscaling, our method explicitly recognizes the presence of various edges and textural details in natural images. Edges and fine-scale details are fundamentally different, and thus need to be upsampled in a fashion unique to their structure.

The exact choice of the texture enhancement step $\epsilon$ likely influences the quality of synthesized details, as well as the speed of the overall method.

Above, we describe a simple, global detail enhancement procedure. A localized, region-specific enhancement can lead to better results.

EFFECT OF THE INVENTION

The invention provides a hybrid method for image upscaling which greatly alleviates prior art problems. The key idea behind our approach is that sharp edges and fine details in natural images exhibit inherently different structure, and hence should be separately processed.

We model the high-resolution output image as a linear sum of an edge layer and a detail layer, and pose the upscaling problem as a highly underdetermined linear inverse system of equations.

We regularize this problem by imposing image-specific priors that all patches of the target image can be well-approximated by the patches extracted from the low-resolution input image. Thus, we obtain an optimization formulation of our upscaling framework.

This optimization is highly non-convex, and is indeed intractable. To resolve this, we devise the following approximate method. First, we use bicubic interpolation to obtain an initial high-resolution estimate.

Next, we greedily replace each patch in the high-resolution image by a weighted sum of "similar" patches from the low-resolution patch manifold.

This step both reconstructs the edge layer, as well as provides an α-map indicating what pixels constitute the detail layer.

Finally, to restore the fine textural details in the image, we decompose the intermediate image into the edge and detail layers using an edge-aware filtering technique, and selectively enhance the detail layer using a parametric pixel-wise remapping function.

The method consistently improves upon state-of-the-art results at a much lower computational costs. The method involves no training or learning of model parameters, and does not need an external database as input.

Additionally, the method is fast and parallelizable, and lends itself to easy potential implementation for very high-definition images and videos.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for upscaling an input image, comprising tile steps off interpolating the input image to produce a first intermediate image;
   sharpening edges in the first intermediate by replacing patches of pixels with a combination of reference patches to obtain a second intermediate image;
   decomposing tile second intermediate image into an edge layer and a detail layer;
   enhancing the detail layer using a mapping function to produce an enhanced detail layer; and
   merging the edge layer and tile enhanced detail layer to produce an output image at a larger resolution than the input image, wherein the steps are performed in a processor;

$$(1-\alpha)\tilde{I}+\alpha f(\tilde{D})=\epsilon(\tilde{I}),$$

wherein $\tilde{I}$ is the first intermediate image, $\alpha$ is a blending factor during the merging, $f$ is the mapping function, $\tilde{D}$ is the enhanced detail layer, and $\epsilon$ is an overall detail-enhancement operator.

2. The method of claim 1, wherein the reference patches are selected from the input image or the first intermediate image.

3. The method of claim 1, wherein the interpolation uses bicubic interpolation.

4. The method of claim 1, wherein the sharpening uses a patch transform P(I), and the patches are r×r overlapping pixels.

5. The method of claim 1, wherein a pixel in the input image is replaced by a mean intensity of the pixels in each patch that contains the pixel.

6. The method of claim 4, wherein the patch transform is non-parametric and local to the patches.

7. The method of claim 1, further comprising:
   removing a DC component of each patch before performing a nearest neighbor optimization; and
   reducing blocking artifacts in each patch.

8. The method of claim 1, wherein variances of intensities of the pixels in each patch that contains the pixel is stored and high variance pixels correspond to the detail layer.

9. The method of claim 1, wherein the decomposing uses weighted least squares.

10. The method of claim 1, wherein the decomposing uses a bilateral filter.

11. The method of claim 1, wherein the mapping function is $$f(\Delta)=\Delta^\beta,$$

wherein an amount of detail is inversely proportional to $\beta$.

12. The claim 1, further comprising:
   applying, iteratively, hack projection after the sharpening and merging steps to enforce consistency of the output image and second intermediate image with the input image.

13. The method of claim 1, wherein the input image is in color, and further comprising:
   converting the input image to a YCbCr space, and applying the interpolation to a luminance channel of the YCbCr space.

14. The method of claim 1, wherein the reference patches in the combination are weighted.

15. The method of claim 1, wherein the reference patches are selected from same sized patches of the input image.

16. The method of claim 1, wherein the reference patches are selected from a dictionary of patches learned from the input image.

17. The method of claim 16, wherein the reference patches are selected by minimizing an error function.

18. The method of claim 17, wherein the error function is a weighted sum of a number of reference patches and a reconstruction error between a particular patch and a reconstruction of the particular patch by the reference patches.

19. The method of claim 17, wherein the error function is a weighted sum of absolute values of weights of the reference patches and a reconstruction error between a particular patch and a reconstruction of the particular patch by the reference patches.

* * * * *